United States Patent
Carvalho et al.

(10) Patent No.: US 11,822,544 B1
(45) Date of Patent: Nov. 21, 2023

(54) RETRIEVAL OF FREQUENCY ASKED QUESTIONS USING ATTENTIVE MATCHING

(71) Applicant: INTUIT INC., Mountain View, CA (US)

(72) Inventors: Vitor R. Carvalho, Mountain View, CA (US); Sparsh Gupta, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 824 days.

(21) Appl. No.: 16/525,777

(22) Filed: Jul. 30, 2019

(51) Int. Cl.
*G06N 20/00* (2019.01)
*G06N 3/044* (2023.01)
*G06F 16/242* (2019.01)
*G06F 16/28* (2019.01)
*G06F 16/248* (2019.01)
*G06F 16/2457* (2019.01)

(52) U.S. Cl.
CPC .......... *G06F 16/243* (2019.01); *G06F 16/248* (2019.01); *G06F 16/24578* (2019.01); *G06F 16/283* (2019.01); *G06N 3/044* (2023.01); *G06N 20/00* (2019.01)

(58) Field of Classification Search
CPC ............. G06F 16/243; G06F 16/24578; G06F 16/248; G06F 16/283; G06N 3/0445
See application file for complete search history.

(56) References Cited

U.S. PATENT DOCUMENTS

2020/0341964 A1* 10/2020 Sen ...................... G06F 16/2365

OTHER PUBLICATIONS

Jijkoun, Valentin, and Maarten de Rijke. "Retrieving answers from frequently asked questions pages on the web." Proceedings of the 14th ACM international conference on Information and knowledge management. 2005. (Year: 2005).*

Lei, Jie, et al. "Tvqa: Localized, compositional video question answering." arXiv preprint arXiv:1809.01696 (2018). (Year: 2018).*

(Continued)

*Primary Examiner* — Michael J Huntley
*Assistant Examiner* — Sehwan Kim
(74) *Attorney, Agent, or Firm* — Patterson + Sheridan, LLP

(57) ABSTRACT

Aspects of the present disclosure provide techniques for FAQ retrieval. Embodiments include receiving, via a user interface of a computing application, a query related to a subject. Embodiments include generating a first multi-dimensional representation of the query. Embodiments include obtaining a plurality of question and answer pairs related to the subject and, for a given question and answer pair comprising a given question and a given answer, generating a second multi-dimensional representation of the given question and a third multi-dimensional representation of the given answer. Embodiments include providing input to a model based on the first multi-dimensional representation, the second multi-dimensional representation, and the third multi-dimensional representation and determining a match score for the query and the given question and answer pair based on an output of the model. Embodiments include providing, via the user interface of the computing application, the question and answer pair based on the match score.

9 Claims, 6 Drawing Sheets

(56) References Cited

OTHER PUBLICATIONS

Yang, Liu, et al. "Response ranking with deep matching networks and external knowledge in information-seeking conversation systems." The 41st international acm sigir conference on research & development in information retrieval. 2018. (Year: 2018).*

Lu, Jiasen, et al. "Hierarchical question-image co-attention for visual question answering." Advances in neural information processing systems 29 (2016). (Year: 2016).*

Tan, Ming, et al. "Improved representation learning for question answer matching." Proceedings of the 54th Annual Meeting of the Association for Computational Linguistics (vol. 1: Long Papers). 2016. (Year: 2016).*

Tay, Yi, Anh Tuan Luu, and Siu Cheung Hui. "Multi-pointer co-attention networks for recommendation." Proceedings of the 24th ACM SIGKDD International Conference on Knowledge Discovery & Data Mining. 2018. (Year: 2018).*

Tay, Yi, Luu Anh Tuan, and Siu Cheung Hui. "Multi-cast attention networks." Proceedings of the 24th ACM SIGKDD international conference on knowledge discovery & data mining. 2018. (Year: 2018).*

Wu, Yu, et al. "Sequential matching network: A new architecture for multi-turn response selection in retrieval-based chatbots." arXiv preprint arXiv:1612.01627 (2016). (Year: 2016).*

Wang, Kai, Zhaoyan Ming, and Tat-Seng Chua. "A syntactic tree matching approach to finding similar questions in community-based qa services." Proceedings of the 32nd international ACM SIGIR conference on Research and development in information retrieval. 2009. (Year: 2009).*

Pennington, Jeffrey, Richard Socher, and Christopher D. Manning. "Glove: Global vectors for word representation." Proceedings of the 2014 conference on empirical methods in natural language processing (EMNLP). 2014. (Year: 2014).*

Tran, Nam Khanh, and Claudia Niedereée. "Multihop attention networks for question answer matching." The 41st international ACM SIGIR conference on research & development in information retrieval. 2018. (Year: 2018).*

\* cited by examiner

RETRIEVAL OF FREQUENCY ASKED QUESTIONS USING ATTENTIVE MATCHING

INTRODUCTION

Aspects of the present disclosure relate to techniques for providing relevant question and answer pairs in response to queries in computing applications. In particular, embodiments described herein involve using machine learning techniques to identify question and answer pairs relevant to a query based on query-question and query-answer similarities.

BACKGROUND

The ability to effectively rank question-answer pairs after an input of a query, often referred to as frequently asked question (FAQ) retrieval, is a fundamental feature of many computing applications. Search is particularly important to applications with large FAQ databases, such as FAQ forums, where a positive user experience is often linked to effective search capabilities.

Many conventional FAQ retrieval techniques rely on "feature engineering", or the identification of distinguishing features, for surfacing similarities between a given query and questions included in an FAQ database. For instance, certain manual feature engineering techniques involve the use of language parsing to discover semantic and/or syntactic structures that can be used as features for identifying similarities between the query and particular questions. Feature engineering is often time-consuming and challenging, as it requires extensive analysis of queries and questions.

Accordingly, there is a need in the art for improved techniques for FAQ retrieval.

BRIEF SUMMARY

Certain embodiments provide a method. The method generally includes: receiving, via a user interface of a computing application, a query related to a subject; generating a first multi-dimensional representation of the query; obtaining a plurality of question and answer pairs related to the subject; for a given question and answer pair comprising a given question and a given answer, generating a second multi-dimensional representation of the given question and a third multi-dimensional representation of the given answer; providing input to a model based on the first multi-dimensional representation, the second multi-dimensional representation, and the third multi-dimensional representation; determining a match score for the query and the given question and answer pair based on an output of the model; and providing, via the user interface of the computing application, the question and answer pair in response to the query based on the match score.

Other embodiments provide a non-transitory computer-readable medium comprising instructions that, when executed by one or more processors of a computer system, cause the computer system to perform a method. The method generally includes: receiving, via a user interface of a computing application, a query related to a subject; generating a first multi-dimensional representation of the query; obtaining a plurality of question and answer pairs related to the subject; for a given question and answer pair comprising a given question and a given answer, generating a second multi-dimensional representation of the given question and a third multi-dimensional representation of the given answer; providing input to a model based on the first multi-dimensional representation, the second multi-dimensional representation, and the third multi-dimensional representation; determining a match score for the query and the given question and answer pair based on an output of the model; and providing, via the user interface of the computing application, the question and answer pair in response to the query based on the match score.

Other embodiments provide a system comprising one or more processors and a non-transitory computer-readable medium comprising instructions that, when executed by the one or more processors, cause the system to perform a method. The method generally includes: receiving, via a user interface of a computing application, a query related to a subject; generating a first multi-dimensional representation of the query; obtaining a plurality of question and answer pairs related to the subject; for a given question and answer pair comprising a given question and a given answer, generating a second multi-dimensional representation of the given question and a third multi-dimensional representation of the given answer; providing input to a model based on the first multi-dimensional representation, the second multi-dimensional representation, and the third multi-dimensional representation; determining a match score for the query and the given question and answer pair based on an output of the model; and providing, via the user interface of the computing application, the question and answer pair in response to the query based on the match score.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
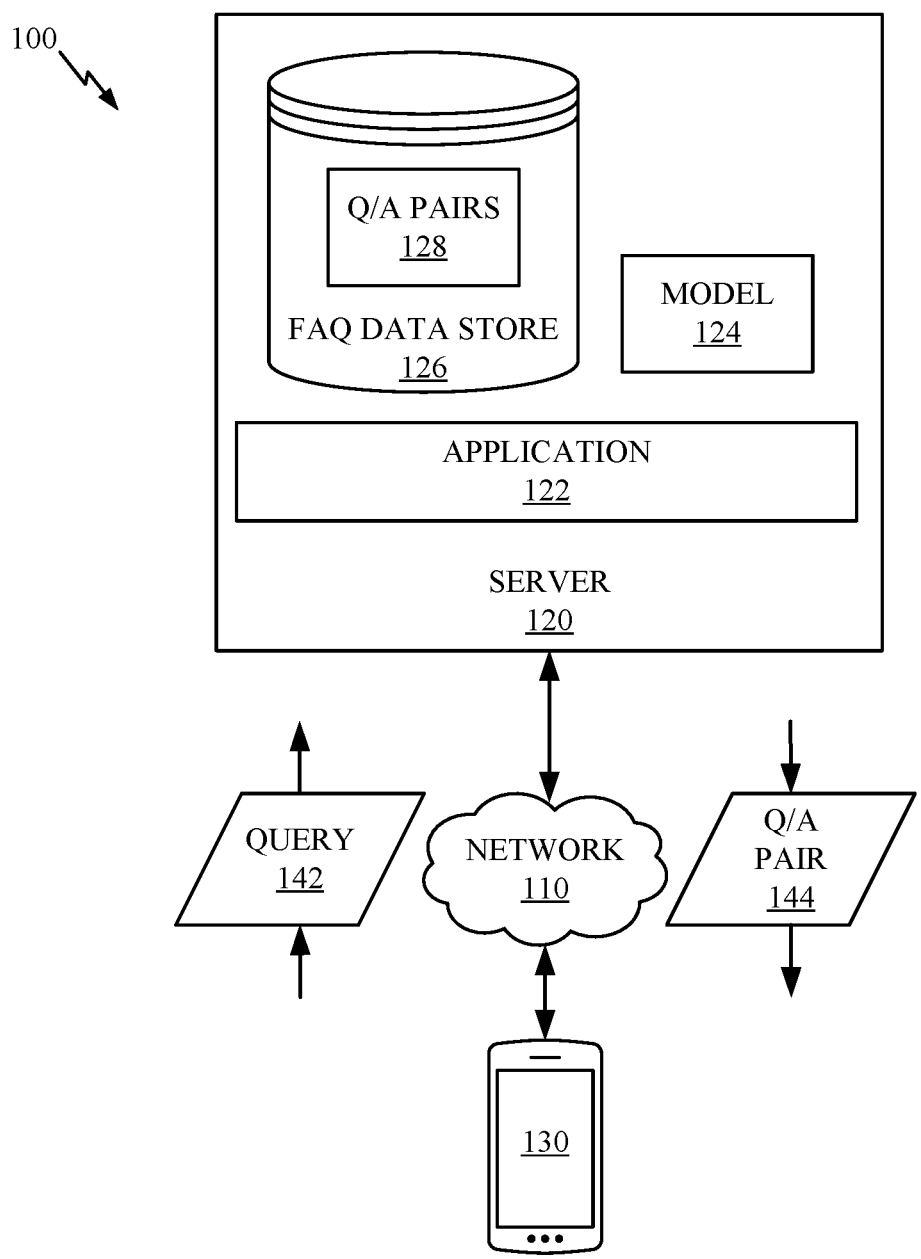
FIG. 1 depicts an example computing environment for FAQ retrieval using attentive matching.

Aspects of the present disclosure provide apparatuses, methods, processing systems, and computer readable mediums for frequently asked question (FAQ) retrieval using attentive matching.

Computing applications may allow a user to retrieve FAQs by inputting a query. As used herein, a query generally refers to a string input by a user to a user interface to retrieve FAQs. An FAQ generally includes a question and a corresponding answer. Conventional techniques for FAQ retrieval often involve comparing a given query only to questions, which may not always be an effective means of identifying a relevant FAQ for the given query. For example, the query "how do I deduct refinancing costs?" and the question "how do I upgrade to premium edition?" may both relate to the answer "Premium edition provides advanced features, such as deducting refinancing costs. Please visit the upgrade page on our website to upgrade." Comparing features of the query to features of the question may not result in a match, as the query and the question do not contain similar words. Furthermore, processing queries and questions to determine features based on conventional feature engineering techniques is often a time-consuming process. For example, feature engineering may involve extensive manual review in order to discover semantic and/or syntactic structures that can be used as features for identifying similarities between the query and particular FAQs.

Accordingly, embodiments of the present disclosure involve using attention matching to determine similarities between a query and a question as well as between the query and an answer associated with the question in order to efficiently and accurately identify FAQs relevant to the query. "Attention matching" mechanisms are loosely based on the visual attention mechanism of the human brain, and generally involve focusing on certain subsets of data with "high resolution" while perceiving the rest of the data in "low resolution", adjusting the focal point over time. In particular, certain techniques described herein involve the use of deep learning models such as deep matching networks, multi-hop attention networks, and Symmetric Bilateral Multi-Perspective Matching (SymBiMPM) models, to perform attention matching without the need to perform feature engineering.

Deep matching networks, multi-hop attention networks, and SymBiMPM models are types of neural networks. Neural networks generally include a plurality of connected units or nodes called artificial neurons, loosely modeling the neurons in a biological brain. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network.

Deep matching networks (DMN) can be used to determine scores for ranking purposes as described herein. According to certain embodiments, a DMN includes a convolutional input layer that accepts a two-channel input, followed by one or more fully connected layers (e.g., where every neuron in one layer is connected to every neuron in another layer), including an output layer that outputs a matching score. In some embodiments, the two-channel input is received by two nodes. The first node processes the first channel of the two-channel input by taking the dot product of representations of words of a query with representations of words of a given question. Similarly, the second node processes the second channel of the two-channel input by taking the dot product of representations of words of the query with representations of words of the corresponding answer. Representations of words in queries, questions, and answers may be multi-dimensional representations (e.g., vectors comprising a series of n values that define a position in n-dimensional space). In some embodiments, existing techniques such as GloVe embeddings are employed to generate word representations based on queries, questions, and answers. A representation of a query, a question, or an answer may be a matrix comprising a vector for each word in the query, question, or answer. In certain embodiments, the representations are further improved through the use of a long short-term memory (LSTM) layer or a bi-directional LSTM (Bi-LSTM) layer or gated recurrent unit (GRU) of the model.

In certain embodiments, a multi-hop attention network (MAN) has a bi-LSTM layer that takes a query, a question, and a corresponding answer as inputs to generate representations for all words of the query, question, and answer. In some embodiments, the representations of the question and answer are combined into a single representation or set of representations that is compared to representations of the query. The representations are passed through multiple layers or multiple "hops" of attention to get "attended" representations (e.g., representations that have been improved by focusing on particular words, modifying the vectors of the words based on context such as neighboring words) of the query and the combined question and answer at each hop. Each layer of attention focuses on different parts of the query and the question and answer in order to ultimately determine a matching score. The model is thus able to compare a query to a question-and-answer pair from multiple perspectives (e.g., by comparing different parts of the query to different parts of the question and answer).

A SymBiMPM model generally uses a multi-perspective matching block to compare two sequences and generates matched representations for both of these sequences. This block has four different matching mechanisms that are used on the input sequences. Matching is applied in both the directions, i.e. if P and Q are the two inputs (e.g., a query and a question, a query and an answer, or a query and a combined question and answer), then the output is a matched representation of P obtained by attending to Q, and a matched representation of Q obtained by attending to P. The multi perspective matching block may be used in a symmetric fashion for query-question and query-answer matching followed by an attention layer and fully connected layers to get the final match score. For example, the SymBiMPM may comprise a multilayer perceptron, which is a neural network that includes at least three layers—an input layer, at least one hidden layer, and an output layer.

In certain embodiments, an input layer includes a multi-perspective match block that is first used to generate attended representations of a query-question combination. The same match block is used to generate matched representations of a query-answer combination. This step results in one representation for each of the question and the answer, and two representations for the query. These two representations ($O_{qQ}$ and $O_{qA}$) may be combined into a single representation $O_q$ using an attention mechanism expressed by the equation $O_q = \tanh(W_Q O_{qQ} + W_A O_{qA})$, where tanh represents a hyperbolic tangent function and $W_Q$ and $W_A$ represent attention matrices applied to $O_{qQ}$ and $O_{qA}$. This formula is used to form a representation vector that is passed through various neural network layers to get a match score between the query and the question-and-answer pair.

Once a matching score is determined between a query and each of a plurality of question-and-answer pairs, such as by using a DMN, MAN, or SymBiMPM model, the matching scores are used to select relevant question-and-answer pairs for providing in response the query. For example, the question-and-answer pairs may be ranked according to matching score, and at least some of the question-answer pairs (e.g., that have a matching score above a threshold) may be provided in response to the query for presentation in a user interface, such as in the ranked order.

It is noted that, while certain types of models, such as DMN, MAN, and SymBiMPM models, are described herein, embodiments of the present disclosure may be implemented with different types of models.

Embodiments of the present disclosure are an improvement over conventional techniques for FAQ retrieval, such as those based only on query-question similarity and those involving extensive manual feature engineering, as they allow for more accurate matching between a query and a question-and-answer pair without requiring time-consuming feature engineering. Improved FAQ retrieval further improves computing applications by allowing more relevant content to be provided more efficiently (e.g., by not requiring manual feature engineering) to users in response to queries and by reducing extraneous processing associated with retrieving poorly matched FAQs.

Example Computing Environment

FIG. 1 illustrates an example computing environment 100 for FAQ retrieval using attentive matching.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 generally represents a computing device such as a server computer. Server 120 includes an application 122, which generally represents a computing application that a user interacts with over network 110 via client 130. In some embodiments, application 122 is accessed via a user interface associated with client 130, and allows a user to submit a query for retrieval of FAQs related to application 122. In one example, application 122 is a financial services application such as a tax preparation application, and the FAQs relate to financial services.

Server 120 further includes model 124, which generally represents a machine learning model that is used for FAQ retrieval based on a query. In some embodiments, model 124 is a neural network model, such as a DMN, MAN, or SymBiMPM model, and returns a match score when provided with a query each one of Q/A pairs 128 in turn from FAQ data store 126 as inputs. For example, the query may be provided along with each Q/A pair 128 serially as inputs to model 124.

FAQ data store 126 generally represents a data storage entity such as a database or repository that stores Q/A pairs 128. Q/A pairs 128 generally represent FAQs and associated answers, and may have been generated based on input from subject matter experts, such as support professionals.

In certain embodiments, model 124 is trained based on a training data set that includes a plurality of training inputs comprising queries and question-answer pairs, where each combination of a given query and a given question-and-answer pair is associated in the training data with a label that indicates a match score indicating a measurement of relevance of the question-and-answer pair to the query. Labels in the training data may have been assigned by subject matter experts and/or may have been automatically determined based on historical user input, such as whether users clicked on certain question-and-answer pairs after entering a certain query, how much time users spent viewing certain question-and-answer pairs, and/or whether users provided feedback with respect to certain question-and-answer pairs.

In some embodiments, training model 124 involves providing training inputs (e.g., combinations of queries with question-answer pairs) to nodes of an input layer of model 124. Model 124 processes the training inputs through its various layers and outputs match scores. The match scores are compared to the labels associated with the training inputs to determine the accuracy of model 124, and parameters of model 124 are continuously adjusted until the match scores produced by model 124 based on the training inputs match the labels associated with the training inputs. Parameters adjusted during training may include, for example, hyperparameters, related to numbers of iterations, numbers of hidden layers and nodes, weights, and connections between layers and nodes, as well as functions associated with nodes.

Client 130 generally represents a computing device such as a mobile phone, laptop or desktop computer, tablet computer, or the like. Client 130 is used to access application 122 over network 110, such as via a user interface associated with client 130. In alternative embodiments, application 122 runs directly on client 130.

In one example, client 130 transmits a query 142 to server 120, such as based on input received via the user interface. Query 142 comprises a string input by a user, such as using a keyboard or via voice input. In one example, the user enters query 142 to client 130 in order to retrieve FAQs related to a subject, such as financial services. Application 122 receives query 142 and uses model 124 to determine a match score for each given Q/A pair of Q/A pairs 128 with respect to query 142.

In certain embodiments, application 122 determines representations of query 142 and each of Q/A pairs 128, each representation comprising a vector for each word, each vector including n values defining a point in n-dimensional space that represents the word (e.g., relative to other words). For instance, the representations may be determined using GloVe embeddings, which is an existing learning algorithm for obtaining vector representations for words.

For each given Q/A pair of Q/A pairs 128, application 122 provides the representations of the question and answer along with the representation of query 142 as inputs to model 124, and model 124 outputs a match score. The match scores are then used by application 122 to determine which selected subset of Q/A pairs in Q/A pairs 128 to provide to client 130 in response to query 142 and, in some embodiments, an order in which the selected subset of Q/A pairs should be displayed via the user interface. In the depicted example, application 122 determines that Q/A pair 144 is relevant to query 142, such as based on the match score being above a threshold, and transmits Q/A pair 144 to client 130 for display via the user interface of a client-side component of application 122.

Example Deep Matching Network for FAQ Retrieval

Figure 2:
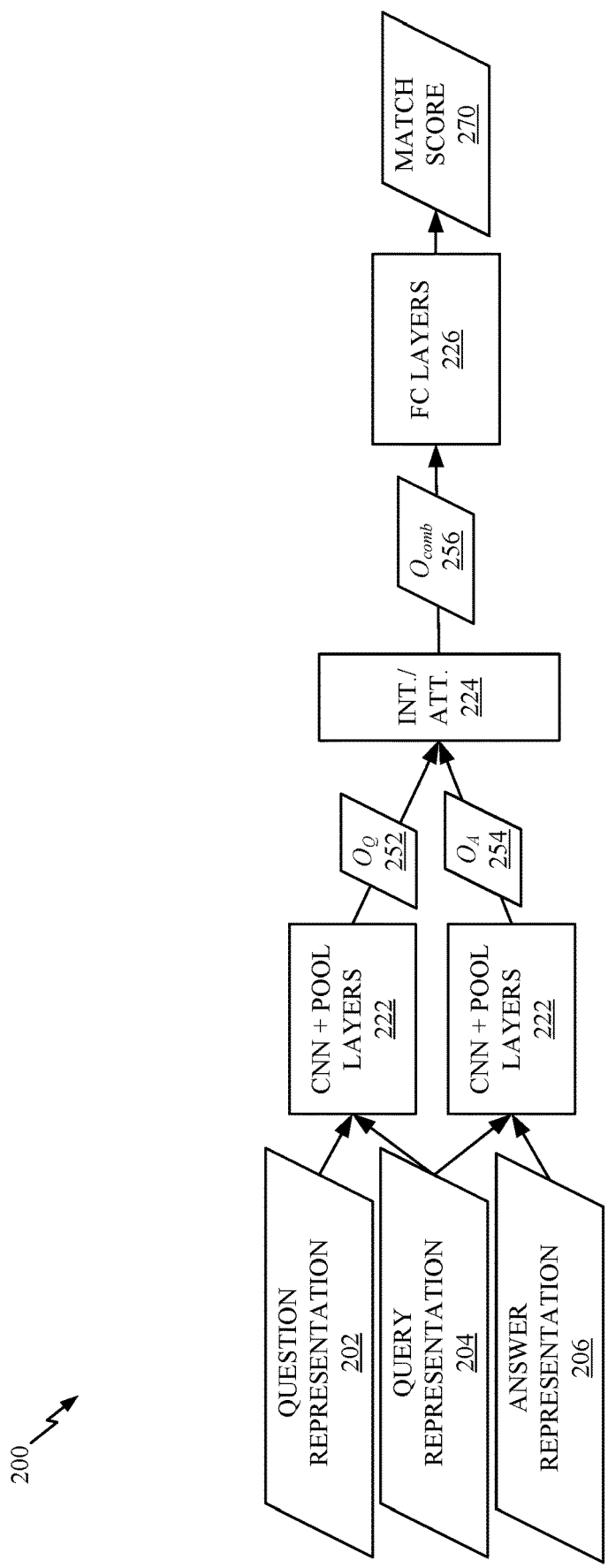
FIG. 2 depicts an example embodiment related to FAQ retrieval using attentive matching.

FIG. 2 depicts an example embodiment 200 of FAQ retrieval using attentive matching. In particular, embodiment 200 involves the use of a DMN.

Embodiment 200 includes convolutional neural network (CNN) and pooling layers 222 of the DMN. A CNN layer systematically applies learned filters to input data in order to create feature maps that summarize the presence of those features in the input data. Pooling layers generally follow CNN layers, and summarize the presence of features in subsets or patches of the feature map.

Question representation 202 and representation are provided as a two-channel input to CNN and pooling layers 222 and, separately, answer representation 206 and query representation 204 are also provided as a two-channel input to CNN and pooling layers 222. For example, these separate two-channel inputs may be provided serially or in parallel to CNN and pooling layers 222.

In certain embodiments, question representation 202, query representation 204, and answer representation 206 are matrices comprising vectors that represent each word of a question, a query, and an answer, respectively (e.g., determined using GloVe embeddings and/or an LSTM layer, Bi-LSTM layer, or GRU that is not shown). It is noted that matrices made up of vectors comprising GloVe embeddings of every word in a query, question, or answer are only included as one embodiment of the representations, and other types of representations of queries, questions, and answers may be employed.

In certain examples, a dot product of question representation 202 and query representation 204 is determined, and the dot product is provided as the first two-channel input to CNN and pooling layers 222. Similarly, a dot product of answer representation 206 and query representation 204 is determined, and the dot product is provided as the second two-channel input to CNN and pooling layers 222. CNN and pooling layers 222 output $O_Q$ 252, which represents query-question interaction, and $O_A$ 254, which represents query-answer interaction. $O_Q$ 252 and $O_A$ 254 are combined using interpolation or attention at 224 to produce $O_{comb}$ 256.

$O_Q$ 252 and $O_A$ 254 may be combined to produce $O_{comb}$ 256 in a variety of different ways. In one embodiment, interpolation is used to add the question and answer representations in a weighted manner characterized by the weight $\lambda$. In such embodiments, the combined representation is determined by applying the formula $O_{comb}=\lambda O_Q+(1-\lambda)O_A$ at node 334.

In another embodiment, an attention mechanism is used to combine $O_Q$ and $O_A$. The use of an attention mechanism allows the model to dynamically determine whether the question or the answer should be weighted more heavily, separately in every dimension of the representations, such as by focusing on different subsets of the representations. In one example, the combined representation is determined by applying the formula $O_{comb}=\tanh(W_Q O_Q+W_A O_A)$ at node 334, where tanh represents a hyperbolic tangent function and $W_Q$ and $W_A$ represent attention matrices applied to $O_Q$ and $O_A$. The application of $W_Q$ and $W_A$ to $O_Q$ and $O_A$ allows different subsets of $O_Q$ and $O_A$ to be considered in determining $O_{comb}$.

$O_{comb}$ 256 is provided to fully connected (FC) layers 226 of the model, which process $O_{comb}$ 256 using deep matching techniques to determine a match score 270. FC layers 226 generally comprise one or more layers in which every node of a given layer is connected to every node of another layer. The last layer of FC layers 226 is an output layer, which outputs match score 270.

Match score 270 may be used by a computing application, such as application 122 of FIG. 1, to determine whether the Q/A pair represented by question representation 202 and answer representation 206 is relevant to the query represented by query representation 204 and/or to determine a ranking of the Q/A pair relative to other Q/A pairs. For example, application 122 of FIG. 1 may compare match score 270 to a threshold to determine whether the Q/A pair is relevant to the query.

The layers, nodes, and connections depicted in embodiment 200 are only included as an example, and other arrangements are possible.

Example Multi-Hop Attention Network for FAQ Retrieval

Figure 3:
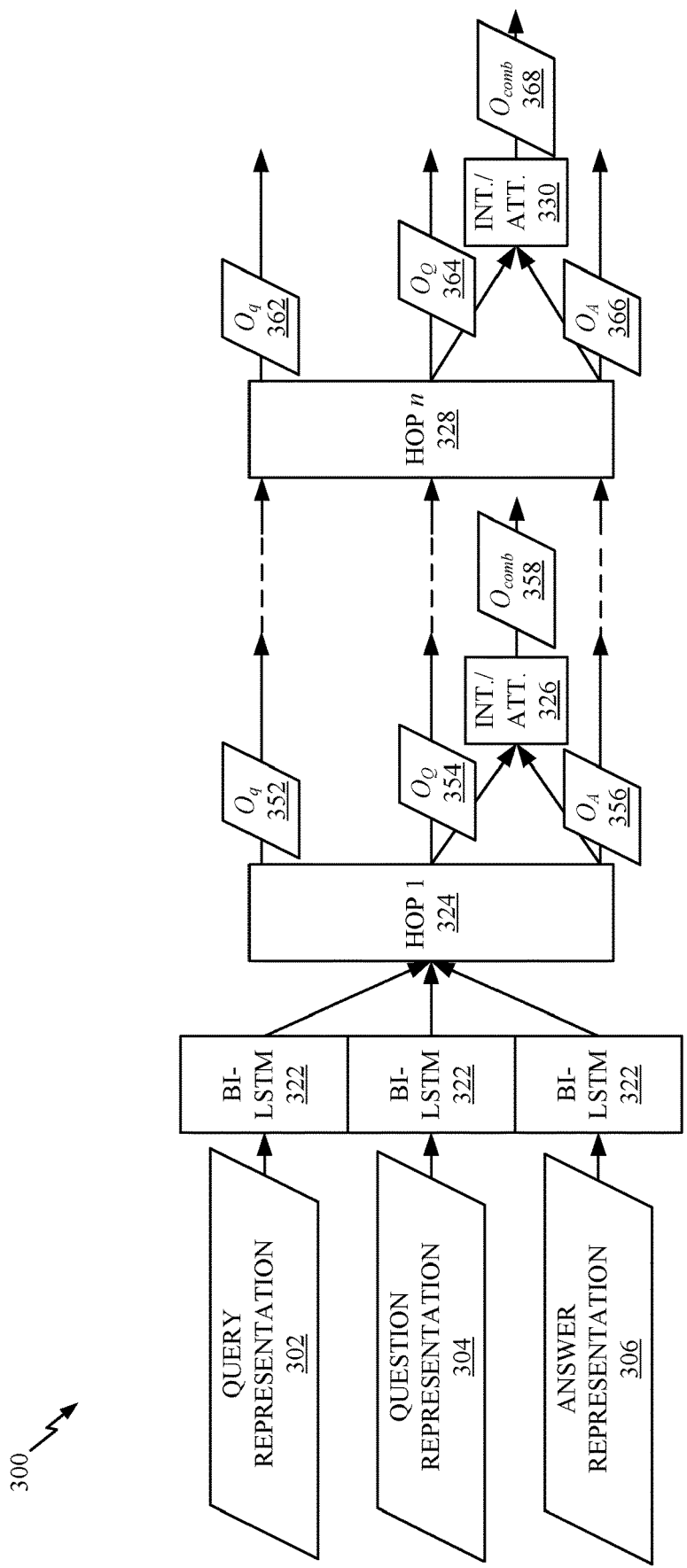
FIG. 3 depicts another example embodiment related to FAQ retrieval using attentive matching.

FIG. 3 depicts another example embodiment 300 of FAQ retrieval using attentive matching. In particular, embodiment 300 involves the use of a MAN.

Query representation 302, question representation 304, and answer representation 306 (generally representative of query representation 202, question representation 204, and answer representation 206, as described above with respect to FIG. 2) are each provided to a bi-LSTM layer 322.

Each node or neuron in bi-LSTM layer 322 generally includes a cell, an input gate, an output gate and a forget gate. The cell generally stores or "remembers" values over certain time intervals in both a backward direction (e.g., data input to the node) and a forward direction (e.g., data output by the node), and the gates regulate the flow of data into and out of the cell. As such, bi-LSTM layer 322 hones the representations by modifying vectors of words based on remembered data, such as vectors of words preceding and following a given word in a query, question, or answer, thereby providing a more contextualized representation of each word. For example, if a question includes the word "happy" preceded by the word "not", the vector representing happy may be modified to a different multi-dimensional representation to reflect the more negative sentiment implied by the preceding word "not". The gates may be used to determine which contextual information is remembered by the cell with respect to a given word, such as the neighboring words within a certain distance or within the same sentence, and which contextual information is forgotten by the cell, such as all data relevant to a preceding sentence that has ended.

Improved representations of query, question, and answer are provided to hop 1 of the model at 324. Each hop 1-$n$ of the model generally applies attention mechanisms to the improved representations of the query, question, and answer to iteratively focus on different subsets of the representations, such as by comparing vectors for particular words between query, question, and answer. The model is thus able to compare the query to the question and answer from multiple different perspectives. At each hop, cosine similarity between the query and the question and/or answer is computed. The cosine similarities at each hop are summed to compute the final match score. With $O_q$, $O_Q$, and $O_A$ being the representations of query, question and answer respectively during any stage in forward pass (e.g., as data is passed forward between hops), $O_Q$, and $O_A$ are combined at each hop to produce $O_{comb}$. For example, as described above with respect to FIG. 2, interpolation or attention may be used to produce $O_{comb}$.

In embodiment 300, $O_Q$ 354 and $O_A$ 356 are combined using interpolation or attention at 326 to produce $O_{comb}$ 358, while $O_q$ 352 is passed forward as-is. Each of $O_q$, $O_Q$, $O_A$, and $O_{comb}$ is passed through n hops and, after hop n 328, $O_Q$ 364 and $O_A$ 366 are combined using interpolation or attention at 330 to produce $O_{comb}$ 358, while $O_q$ 362 is passed forward as-is. Match scores are determined at each hop by computing cosine similarity between $O_q$ and $O_{comb}$ and these match scores are ultimately aggregated, such as by summing them together, to produce a final match score.

This process can be expressed formulaically as follows, with sim representing a simulation function that executes the MAN to determine a match score between a query q and a question and answer pair represented by comb, and with $O_q^{(k)}$ and $O_{comb}$ referring to $O_q$ and $O_{comb}$ after the $k^{th}$ hop in the network:

$$\text{sim}(q, \text{comb}) = \Sigma_k \cos(O_q^{(k)}, O_{comb}^{(k)})$$

The MAN may have been trained using hinge loss with L2 regularization. Hinge loss is a type of loss function for training machine learning models, and generally involves optimizing the function in order to minimize loss, and L2 regularization generally involves the use of linear regression. In certain embodiments, the hinge loss function L can be expressed as follows, where M is a margin:

$$L = \max\{0, M - \text{sim}(q, a+) + \text{sim}(q, a-)\}.$$

Minimizing L allows the MAN to generate a high matching score for the relevant FAQs for a given input query, and generate low matching scores for irrelevant FAQs. In the above equation, M is the margin, or the desired difference in matching scores between relevant and irrelevant FAQs for a given input query. For example, if M=5.0, then ideally the difference between matching scores for relevant and irrelevant FAQs should be at least 5.0. The value of M is a hyperparameter, and needs to be tuned. For instance, it can be different for different datasets. In the above equation, q is the input query, a+ is a relevant FAQ and a− is an irrelevant FAQ. The sim(x,y) function denotes the matching score between two inputs x and y, which in this case may refer to a query and a question and/or answer.

Figure 4:
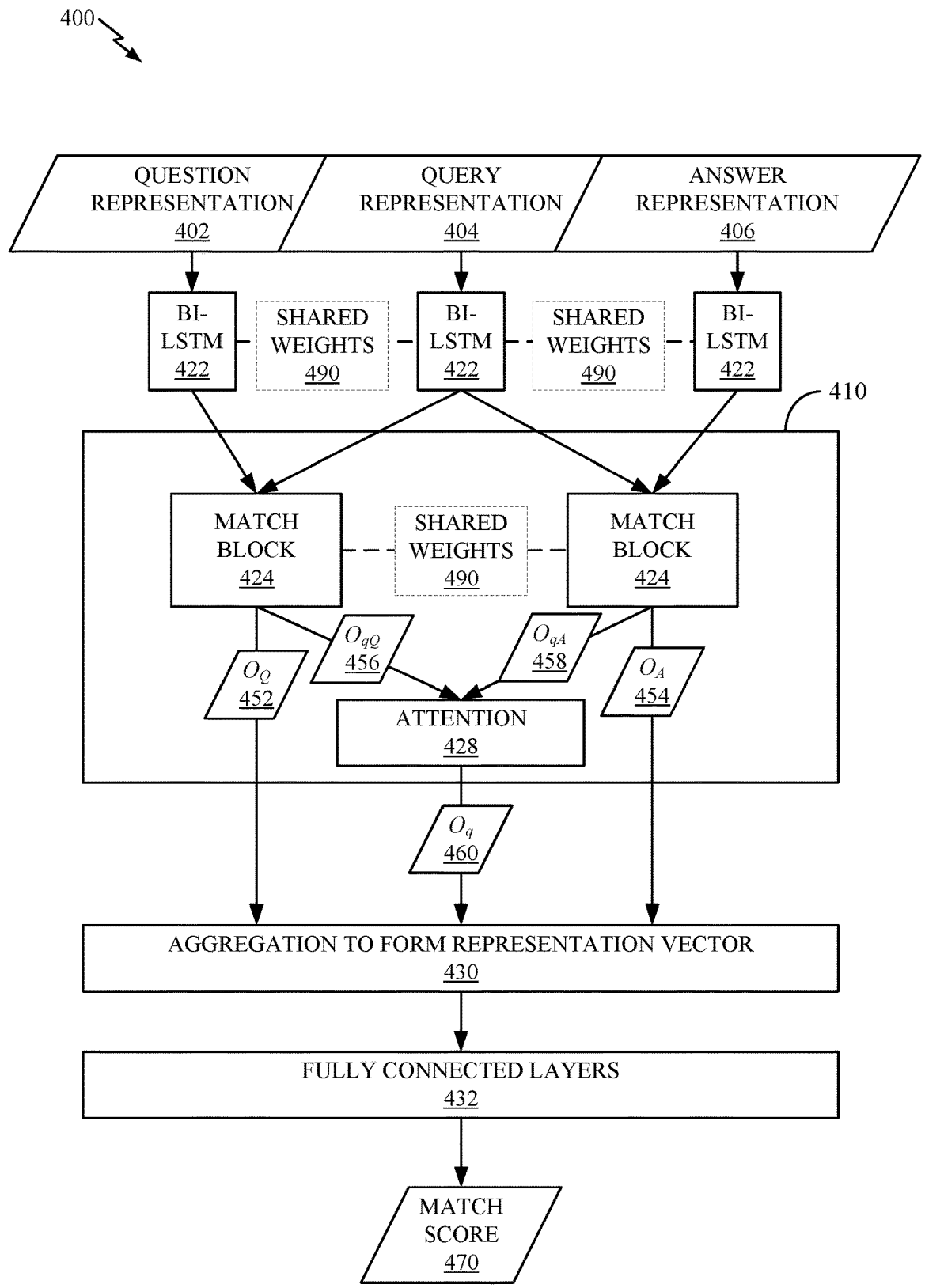
FIG. 4 depicts another example embodiment related to FAQ retrieval using attentive matching.

Example Symmetric Bilateral Multi Perspective Matching Model for FAQ Retrieval FIG. 4 depicts another example embodiment 400 of FAQ retrieval using attentive matching. In particular, embodiment 400 involves the use of a SymBiMPM.

Query representation 402, question representation 404, and answer representation 406 (generally representative of query representations 202 and 203, question representations 204 and 304, and answer representations 206 and 306, as described above with respect to FIGS. 2 and 3) are each provided to a bi-LSTM layer 422. Bi-LSTM layer 422 is generally representative of bi-LSTM layer 322, as described above with respect to FIG. 3. Bi-LSTM layer 422 has shared weights 490 that are used to weight the query, question, and answer representations. Improved representations of the query and question are output from bi-LSTM layer 422 to match block 424, and improved representations of the query and answer are also output from bi-LSTM layer 422 to match block 424.

Match block 424 generally represents a multi-perspective matching block of the SymBiMPM model that compares two sequences and generates matched representations for both these sequences. Match block 424 has four different matching mechanisms that are used on the input sequences. Matching is applied in both the directions, i.e. if P (query representation) and Q (question or answer representation) are the two inputs, then the output is a matched representation of P obtained by attending to Q (e.g., focusing on aspects of Q), and a matched representation of Q obtained by attending to P (e.g., focusing on aspects of P). Match block 424 uses shared weights 490, which indicate how the query, question, and answer are weighted. Match block 424 is used in a symmetric fashion for query-question and query-answer matching followed by an attention mechanism and fully connected layers to get the final match score.

When provided with representations of the query and the question, match block 424 outputs $O_Q$ 452, which is a matched representation of the question obtained by attending to the query, and $O_{qQ}$ 456, which is a matched representation of the query obtained by attending to the question. When provided with representations of the query and the answer, match block 424 outputs $O_A$ 454, which is a matched representation of the answer obtained by attending to the query, and $O_{qA}$ 458, which is a matched representation of the query obtained by attending to the answer. In other words, match block 424 is first used to generate attended representations of the query-question combination, and then the same match block 424 is used to generate matched representations of the query-answer combination. This step results in one representation for each of the question ($O_Q$ 452) and the answer ($O_A$ 454), and two representations for the query ($O_{qQ}$ 456 and $O_q$ A 458).

$O_{qQ}$ 456 and $O_{qA}$ 458 are combined into a single representation $O_q$ using an attention mechanism at 428. For example, the attention mechanism may be expressed by the equation $O_q = \tanh(W_Q O_{qQ} + W_A O_{qA})$, where tanh represents a hyperbolic tangent function and $W_Q$ and $W_A$ represent attention matrices applied to $O_{qQ}$ and $O_{qA}$. The output of this formula is used, along with $O_Q$ 452 and $O_A$ 454 to form a representation vector at 430, which is then passed through various fully connected layers 432 to get a match score 470 between the query and the question-and-answer pair.

Example Operations for FAQ Retrieval Using Attentive Matching

Figure 5:
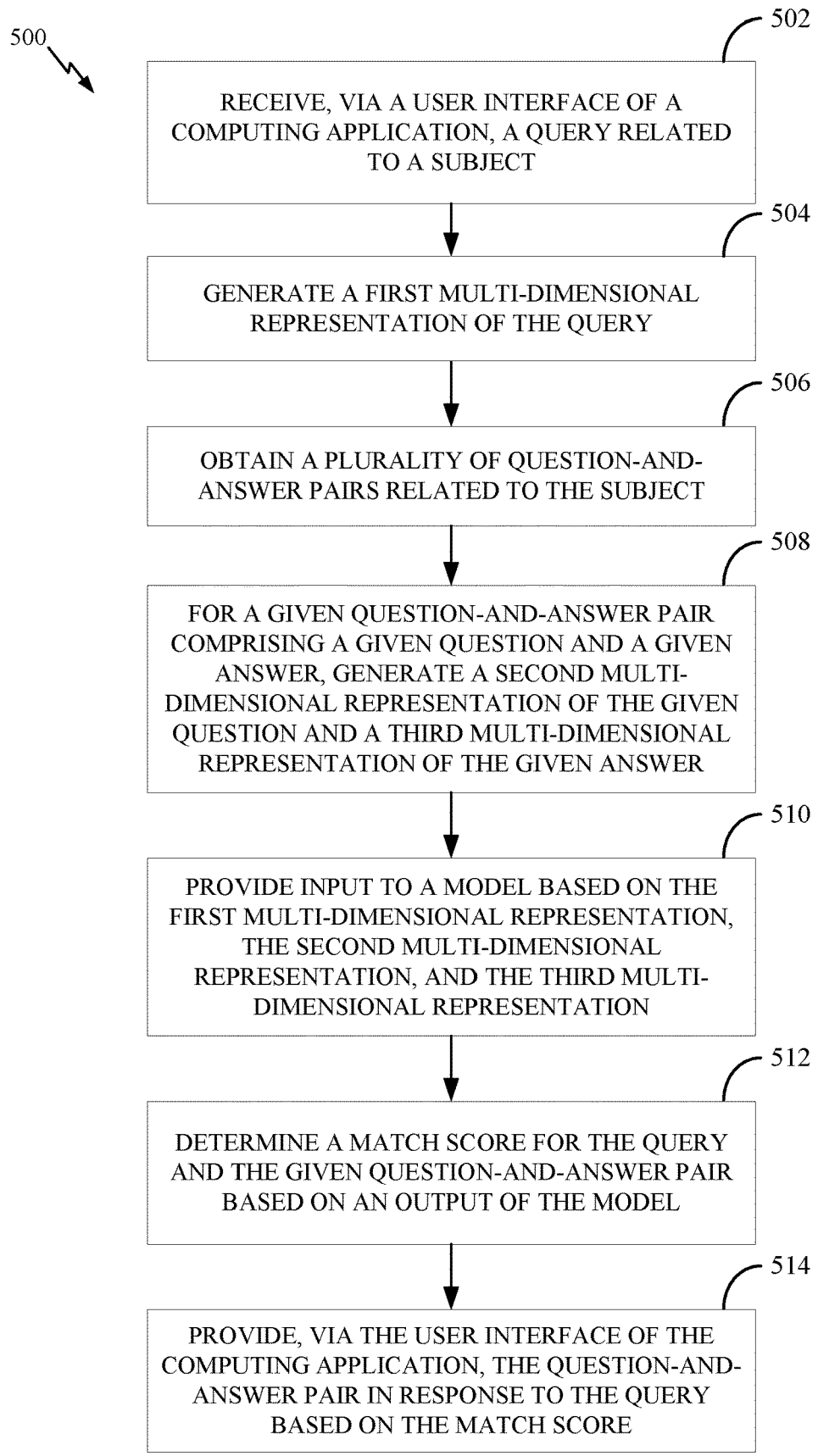
FIG. 5 depicts example operations for FAQ retrieval using attentive matching.

FIG. 5 depicts example operations 500 for FAQ retrieval using attentive matching. For example, operations 500 may be performed by application 122 of FIG. 1.

At step 502, a query related to a subject is received via a user interface of a computing application. For example, application 122 of FIG. 1 may receive the query from client 130 of FIG. 1. In certain embodiments, the query was entered by a user via a user interface, and relates to a subject associated with the computing application. In one example, the subject is financial services, such as tax preparation, and the query relates to tax deductions.

At step 504, a first multi-dimensional representation of the query is generated. For example, GloVe embeddings may be used to produce an n-dimensional vector for each word in the query representing a point in n-dimensional space. It is noted that other types of representations ay alternatively be used.

At step 506, a plurality of question-and-answer pairs related to the subject are obtained. In certain embodiments, application 122 of FIG. 1 obtains Q/A pairs 128 from FAQ data store 126 of FIG. 1. In one example, the question-and-answer pairs are related to the subject of financial services.

At step 508, for a given question-and-answer pair comprising a given question and a given answer, a second multi-dimensional representation of the given question and a third multi-dimensional representation of the given answer are generated. In some embodiments, application 122 of FIG. 1 generates the second multi-dimensional representation and the third multi-dimensional representation by using GloVe embeddings to produce an n-dimensional vector for each word in the given question and the given answer representing points in n-dimensional space.

In certain embodiments, the first multi-dimensional representation, the second multi-dimensional representation, and the third multi-dimensional representation are further improved by passing them through a bi-LSTM layer of a model in order to adjust representations of words based on contextual information such as neighboring words.

At step 510, input is provided to a model based on the first multi-dimensional representation, the second multi-dimensional representation, and the third multi-dimensional representation. For example, application 122 of FIG. 1 may provide the first multi-dimensional representation, the second multi-dimensional representation, and the third multi-dimensional representation as inputs to model 124 of FIG. 1. In certain embodiments, the model is a neural network such as a deep matching network (DMN), multi-hop attention network (MAN), or Symmetric Bilateral Multi-Perspective Matching (SymBiMPM) model.

In a particular embodiment, as described above with respect to CNN and pooling layers 222 of FIG. 2, the first multi-dimensional representation and the second multi-dimensional representation are provided to a convolutional layer of the model to produce a first output, and, separately, the first multidimensional representation and the third multidimensional representation are provided to the convolutional layer of the model to produce a second output. In some embodiments, the first output and the second output are aggregated, such as using interpolation or attention as described above with respect to FIG. 2, to produce a combined representation, and the combined representation is provided to one or more fully connected layers of the model.

In alternative embodiments, as described above with respect to bi-LSTM layer 322 of FIG. 3, the first multi-dimensional representation is provided to an LSTM or bi-LSTM layer of the model to produce a first output based on only on the first multi-dimensional representation, the second multi-dimensional representation is provided to the LSTM or bi-LSTM layer of the model to produce a second output based only only on the second multi-dimensional representation, and the third multi-dimensional representation is provided to the LSTM or bi-LSTM layer of the model to produce a third output based only on the third multi-dimensional representation. The second output and the third output may be aggregated, such as using interpolation or attention, to produce a combined representation, and the combined representation and the first output may be provided to one or more additional layers of the model.

At step 512, a match score is determined for the query and the given question-and-answer pair based on an output of the model. For example, the output of the model may be the match score. In certain embodiments, model 124 of FIG. 1 outputs the match score after processing the first multi-dimensional representation, the second multi-dimensional representation, and the third multi-dimensional representation through multiple hidden layers, including attention mechanisms and/or fully-connected layers, such as FC layer 236 of FIG. 2, hops 1-*n* of FIG. 3, or FC layers 432 of FIG. 4.

At step 514, the question-and-answer pair is provided in response to the query via the user interface of the computing application based on the match score. In an example, application 122 of FIG. 1 determines that the question-and-answer pair is relevant to the query based on the match score exceeding a threshold, and provides the question-and-answer pair to client 130 of FIG. 1 for display via the user interface. In certain embodiments, the question-and-answer pair is provided along with a plurality of other question-and-answer pairs, all of which are ordered for display based on match scores.

Results of FAQ Retrieval Using Attentive Matching

Techniques described herein have resulted in substantial improvements to FAQ retrieval. Experimental results indicate that aggregating the question and answer representations via interpolation or attention so that the aggregated representation is compared to the query representation by a model results in significantly better performance than other techniques, such as comparing the query only to the question or answer, thus showing that the use of both question and answer information is beneficial for FAQ retrieval.

For example, for a DMN, aggregating the question and answer representations using attention resulted in an approximately 2.4% higher normalized discounted cumulative gain (NDCG), which is a measure of ranking quality, than comparing the query only to the question. Similarly, for a MAN, aggregating the question and answer representations using attention resulted in an approximately 3.2% higher NDCG than comparing the query only to the question. Results for using a SymBiMPM model generally exceeded those of all other models tested, showing the effectiveness of attention-based mechanisms in FAQ retrieval tasks.

Example Computing System

Figure 6A:
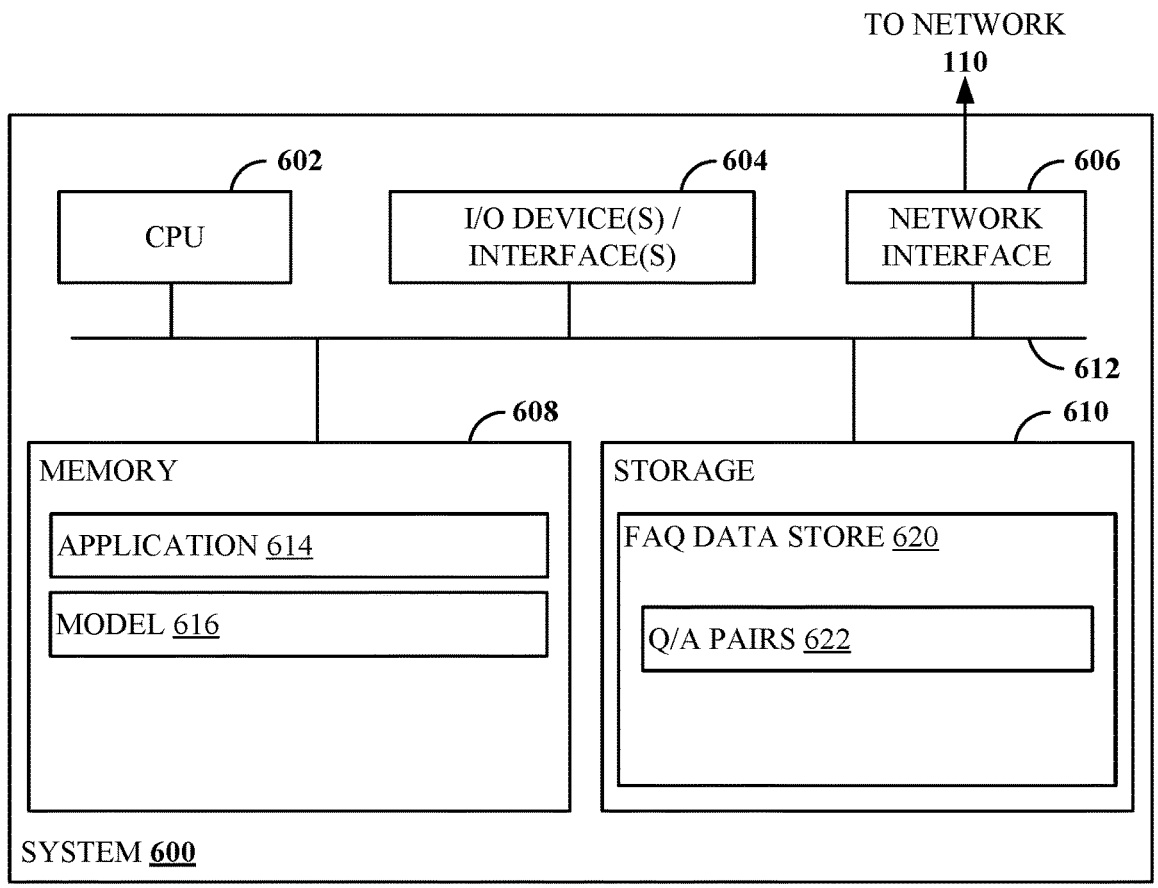
FIGS. 6A and 6B depict example processing systems for FAQ retrieval using attentive matching.

FIG. 6A illustrates an example system 600 with which embodiments of the present disclosure may be implemented. For example, system 600 may be representative of server 120 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614 and model 616, which may be representative of application 122 and model 124 of FIG. 1.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises FAQ data store 620, which may be representative of FAQ data store 126 of FIG. 1. While FAQ data store 620 is depicted in local storage of system 600, it is noted that FAQ data store 620 may also be located remotely (e.g., at a location accessible over a network, such as the Internet). FAQ data store 620 includes Q/A pairs 622, which may be representative of Q/A pairs 128 of FIG. 1.

Figure 6B:
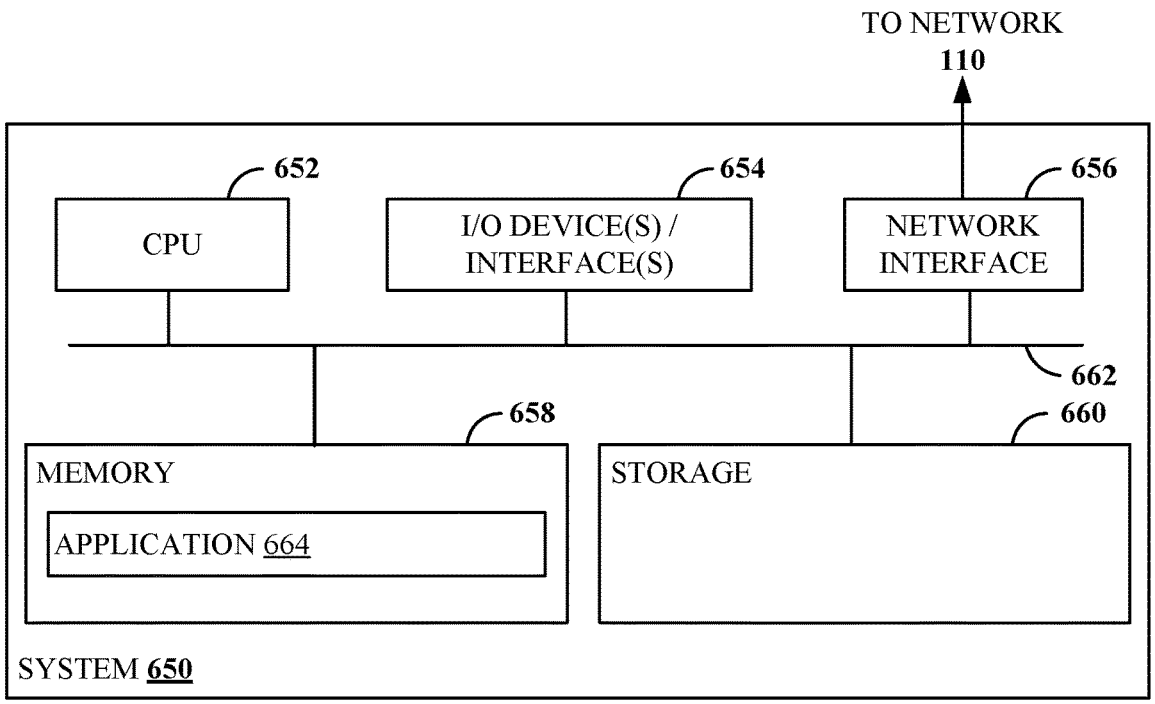

FIG. 6B illustrates another example system 650 with which embodiments of the present disclosure may be implemented. For example, system 650 may be representative of client 130 of FIG. 1.

System 650 includes a central processing unit (CPU) 652, one or more I/O device interfaces 654 that may allow for the connection of various I/O devices 654 (e.g., keyboards, displays, mouse devices, pen input, etc.) to the system 650, network interface 656, a memory 658, storage 660, and an interconnect 662. It is contemplated that one or more components of system 650 may be located remotely and accessed via a network. It is further contemplated that one or more components of system 650 may comprise physical components or virtualized components.

CPU 652 may retrieve and execute programming instructions stored in the memory 658. Similarly, the CPU 652 may retrieve and store application data residing in the memory 658. The interconnect 662 transmits programming instructions and application data, among the CPU 652, I/O device interface 654, network interface 656, memory 658, and storage 660. CPU 652 is included to be representative of a single CPU, multiple CPUs, a single CPU having multiple processing cores, and other arrangements.

Additionally, the memory 658 is included to be representative of a random access memory. As shown, memory 658 includes an application 664, which may be representative of a client-side component corresponding to the server-side application 614 of FIG. 6A. For example, application 664 may comprise a user interface through which a user of system 650 interacts with application 614 of FIG. 6A. In alternative embodiments, application 614 is a standalone application that performs FAQ retrieval as described herein.

Storage 660 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

receiving, via a user interface of a computing application, a query related to a subject;

generating a first multi-dimensional representation of the query;

obtaining a plurality of question and answer pairs related to the subject;

for a given question and answer pair of the plurality of question and answer pairs comprising a given question and a given answer, generating a second multi-dimensional representation of the given question and a third multi-dimensional representation of the given answer;

providing input to a long short term memory layer of a model based on the first multi-dimensional representation, the second multi-dimensional representation, and the third multi-dimensional representation, wherein the long short term memory layer of the model modifies one or more word vectors of the input to generate an improved output comprising a pre-hop first multi-dimensional representation, a pre-hop second multi-dimensional representation, and a pre-hop third multi-dimensional representation;

providing the pre-hop first multi-dimensional representation, the pre-hop second multi-dimensional representation, and the pre-hop third multi-dimensional representation to a sequence of hops of a multi-hop attention network of the model trained using hinge loss with L2 regularization;

generating, at a first hop of the sequence of hops, a first combined multi-dimensional representation that is a combination of the pre-hop second multi-dimensional representation and the pre-hop third multi-dimensional representation, and computing, at the first hop, a first match score by executing a hinge loss simulation function of the multi-hop attention network on the pre-hop first multi-dimensional representation and the first combined multi-dimensional representation;

receiving, at one or more subsequent hops of the sequence of hops subsequent to the first hop, the pre-hop first multi-dimensional representation, the pre-hop second multi-dimensional representation, the pre-hop third multi-dimensional representation, and a combined multi-dimensional representation generated at a previous hop;

generating, at the one or more subsequent hops, one or more subsequent combined multi-dimensional representations that are each combinations of the pre-hop second multi-dimensional representation and the pre-hop third multi-dimensional representation different from the first combined multi-dimensional representation, and computing, at the one or more subsequent hops, one or more subsequent match scores by executing the hinge loss simulation function of the multi-hop attention network on the first pre-hop multi-dimensional representation and the one or more subsequent combined multi-dimensional representations separately analyzes;

determining a final match score for the query and the given question and answer pair by aggregating the first match score and the one or more subsequent match scores;

providing, via the user interface of the computing application, the given question and answer pair in response to the query based on the final match score exceeding a threshold;

determining not to provide a different question and answer pair via the user interface in response to the query based on a corresponding match score for the query and the different question and answer pair not exceeding the threshold;

receiving user input via the user interface based on providing the given question and answer pair; and adjusting one or more parameters of the model based on the user input.

2. The method of claim 1, further comprising adjusting a hyperparameter of the hinge loss simulation function, the hyperparameter comprising a margin between a first final match score for a relevant FAQ and a second final match score for an irrelevant FAQ.

3. The method of claim 1, wherein the one or more subsequent combined multi-dimensional representations are generated by combining the pre-hop second multi-dimensional representation and the pre-hop third multi-dimensional representation using interpolation or attention and using one or more subsets of the pre-hop second multi-dimensional representation and the pre-hop third multi-dimensional representation that are different from a first subset of the pre-hop second multi-dimensional representation and the pre-hop third multi-dimensional representation used to generate the first combined multi-dimensional representation.

4. A system, comprising one or more processors and a non-transitory computer-readable medium comprising instructions that, when executed by the one or more processors, cause the system to perform a method, the method comprising:

receiving, via a user interface of a computing application, a query related to a subject;

generating a first multi-dimensional representation of the query;

obtaining a plurality of question and answer pairs related to the subject;

for a given question and answer pair of the plurality of question and answer pairs comprising a given question and a given answer, generating a second multi-dimensional representation of the given question and a third multi-dimensional representation of the given answer;

providing input to a long short term memory layer of a model based on the first multi-dimensional representation, the second multi-dimensional representation, and the third multi-dimensional representation, wherein the long short term memory layer of the model modifies one or more word vectors of the input to generate an improved output comprising a pre-hop first multi-dimensional representation, a pre-hop second multi-dimensional representation, and a pre-hop third multi-dimensional representation;

providing the pre-hop first multi-dimensional representation, the pre-hop second multi-dimensional representation, and the pre-hop third multi-dimensional representation to a sequence of hops of a multi-hop attention network of the model trained using hinge loss with L2 regularization;

generating, at a first hop of the sequence of hops, a first combined multi-dimensional representation that is a combination of the pre-hop second multi-dimensional representation and the pre-hop third multi-dimensional representation, and computing, at the first hop, a first match score by executing a hinge loss simulation function of the multi-hop attention network on the pre-hop first multi-dimensional representation and the first combined multi-dimensional representation;

receiving, at one or more subsequent hops of the sequence of hops subsequent to the first hop, the pre-hop first multi-dimensional representation, the pre-hop second multi-dimensional representation, the pre-hop third multi-dimensional representation, and a combined multi-dimensional representation generated at a previous hop;

generating, at the one or more subsequent hops, one or more subsequent combined multi-dimensional representations that are each combinations of the pre-hop second multi-dimensional representation and the pre-hop third multi-dimensional representation different from the first combined multi-dimensional representation; and computing, at the one or more subsequent hops, one or more subsequent match scores by executing the hinge loss simulation function of the multi-hop attention network on the first pre-hop multi-dimensional representation and the one or more subsequent combined multi-dimensional representations;

determining a final match score for the query and the given question and answer pair by aggregating the first match score and the one or more subsequent match scores;

providing, via the user interface of the computing application, the given question and answer pair in response to the query based on the final match score exceeding a threshold;

determining not to provide a different question and answer pair via the user interface in response to the query based on a corresponding match score for the query and the different question and answer pair not exceeding the threshold;

receiving user input via the user interface based on providing the given question and answer pair; and adjusting one or more parameters of the model based on the user input.

5. The system of claim 4, the method further comprising adjusting a hyperparameter of the hinge loss simulation function, the hyperparameter comprising a margin between a first final match score for a relevant FAQ and a second final match score for an irrelevant FAQ.

6. The system of claim 4, wherein the one or more subsequent combined multi-dimensional representations are generated by combining the pre-hop second multi-dimensional representation and the pre-hop third multi-dimensional representation using interpolation or attention and using one or more subsets of the pre-hop second multi-dimensional representation and the pre-hop third multi-dimensional representation that are different from a first subset of the pre-hop second multi-dimensional representation and the pre-hop third multi-dimensional representation used to generate the first combined multi-dimensional representation.

7. A non-transitory computer-readable medium comprising instructions that, when executed by one or more processors of a computing system, cause the computing system to:
receive, via a user interface of a computing application, a query related to a subject;
generate a first multi-dimensional representation of the query;
obtain a plurality of question and answer pairs related to the subject;
for a given question and answer pair of the plurality of question and answer pairs comprising a given question and a given answer, generating a second multi-dimensional representation of the given question and a third multi-dimensional representation of the given answer;
provide input to a long short term memory layer of a model based on the first multi-dimensional representation, the second multi-dimensional representation, and the third multi-dimensional representation, wherein the long short term memory layer of the model modifies one or more word vectors of the input to generate an improved output comprising a pre-hop first multi-dimensional representation, a pre-hop second multi-dimensional representation, and a pre-hop third multi-dimensional representation;
providing the pre-hop first multi-dimensional representation, the pre-hop second multi-dimensional representation, and the pre-hop third multi-dimensional representation to a sequence of hops of a multi-hop attention network of the model trained using hinge loss with L2 regularization;
generating, at a first hop of the sequence of hops, a first combined multi-dimensional representation that is a combination of the pre-hop second multi-dimensional representation and the pre-hop third multi-dimensional representation, and computing, at the first hop, a first match score by executing a hinge loss simulation function of the multi-hop attention network on the pre-hop first multi-dimensional representation and the first combined multi-dimensional representation;
receiving, at one or more subsequent hops of the sequence of hops subsequent to the first hop, the pre-hop first multi-dimensional representation, the pre-hop second multi-dimensional representation, the pre-hop third multi-dimensional representation, and a combined multi-dimensional representation generated at a previous hop;
generating, at the one or more subsequent hops, one or more subsequent combined multi-dimensional representations that are each combinations of the pre-hop second multi-dimensional representation and the pre-hop third multi-dimensional representation different from the first combined multi-dimensional representation; and computing, at the one or more subsequent hops, one or more subsequent match scores by executing the hinge loss simulation function of the multi-hop attention network on the first pre-hop multi-dimensional representation and the one or more subsequent combined multi-dimensional representations;
determine a final match score for the query and the given question and answer pair by aggregating the first match score and the one or more subsequent match scores;
provide, via the user interface of the computing application, the given question and answer pair in response to the query based on the final match score exceeding a threshold;
determine not to provide a different question and answer pair via the user interface in response to the query based on a corresponding match score for the query and the different question and answer pair not exceeding the threshold;
receive user input via the user interface based on providing the given question and answer pair; and
adjust one or more parameters of the model based on the user input.

8. The non-transitory computer-readable medium of claim 7, wherein the instructions further cause the system to: adjust a hyperparameter of the hinge loss simulation function, the hyperparameter comprising a margin between a first final match score for a relevant FAQ and a second final match score for an irrelevant FAQ.

9. The non-transitory computer-readable medium of claim 7, wherein the one or more subsequent combined multi-dimensional representations are generated by combining the pre-hop second multi-dimensional representation and the pre-hop third multi-dimensional representation using interpolation or attention and using one or more subsets of the pre-hop second multi-dimensional representation and the pre-hop third multi-dimensional representation that are different from a first subset of the pre-hop second multi-dimensional representation and the pre-hop third multi-dimensional representation used to generate the first combined multi-dimensional representation.

* * * * *